June 24, 1924.
C. HERTEL
1,499,018
OPTICAL INSTRUMENT FOR SPYING PURPOSES
Filed Oct. 20, 1922
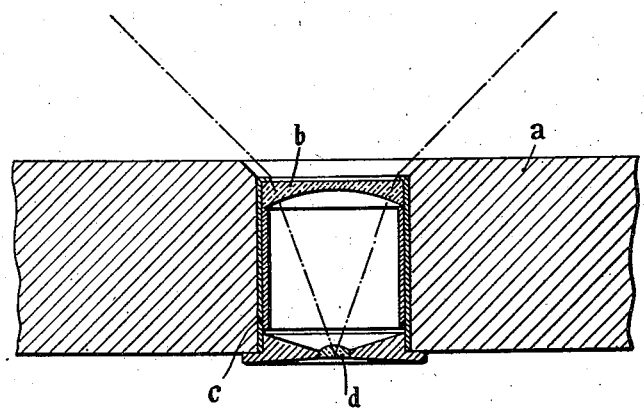
INVENTOR
Carl Hertel
BY
ATTORNEY Patented June 24, 1924.

1,499,018

UNITED STATES PATENT OFFICE.

CARL HERTEL, OF HERMSDORF, NEAR BERLIN, GERMANY, ASSIGNOR TO CHARLES FREDERICK SCHMID, OF NEW ROCHELLE, NEW YORK.

OPTICAL INSTRUMENT FOR SPYING PURPOSES.

Application filed October 20, 1922. Serial No. 595,849.

*To all whom it may concern:*

Be it known that I, CARL HERTEL, a citizen of the German Republic, residing at Hermsdorf, near Berlin, Germany, have invented certain new and useful Improvements in Optical Instruments for Spying Purposes, (for which I have filed patent application in Germany October 21st, 1921), of which the following is a specification.

It is usual to provide in doors for closing apartments, openings allowing the house holder to see persons outside the door without such person seeing the one inside before opening the door.

Such spying openings as hitherto used offer the inconvenience that the person inside the door or wall has not a sufficiently large field of view.

This invention consists in an optical device yielding an enlarged field of view, so that a sufficient portion of a person outside the door can be seen in spite of great narrowness of the aperture.

To this end the new device consists of a lens combination comprising a negative lens element of large diameter and a positive lens element of small diameter. Preferably the negative lens element of large diameter is given a comparatively small focal length, whereas the small positive lens element is given a comparatively large focal length of about double the focal length of the negative lens element.

The optical data for an embodiment of a device in accordance with my invention are as follows:

Negative lens element formed as simple plano concave lens: Diameter 30 mm. Focal length 35 mm. Refraction index about 1.5.

Positive lens element consisting of a simple plano convex lens: Diameter 9 mm. Focal length 63 mm. Refraction index about 1.5.

Distance of the lenses from each other about 35 mm.

The new device mounted within a spying opening of a door is illustrated in the cross-sectional view shown on the annexed drawing.

The door is designated with the reference letter $a$, the negative lens element is designated $b$, the tubular casing for the lens elements $c$ and the positive lens element $d$.

The path of the rays indicated on the drawing represents the field of view which can be overlooked by the observer.

The instrument is to be so inserted into the spying opening of a door, wall or the like that the positive lens $d$ is on the inside of the door and forms the eye lens of the device.

What I claim is:

1. Optical instrument for spying purposes comprising a negative lens element of large diameter and a positive lens element, of small diameter, the axes of the said lenses lying in the same horizontal plane.

2. Optical instrument for spying purposes comprising a negative lens element of large diameter and a positive element of small diameter and greater focal length than the negative element, the axes of the said lenses lying in the same horizontal plane.

3. Optical instrument for spying purposes comprising a negative lens element of large diameter and a positive element of small diameter, the positive element having substantially double the focal length of the negative element, the axes of the said lenses lying in the same horizontal plane.

4. Optical instrument for spying purposes comprising a negative lens element of large diameter and a focal length of substantially 30 mm. and a positive lens element of small diameter and a focal length of substantially 60 mm., the axes of the said lenses lying in the same horizontal plane.

5. Optical instrument for spying purposes comprising a tubular casing a negative lens element of large diameter and a positive element of small diameter, the two elements so mounted within the casing as to form an image producing system.

6. The combination with a door, wall or the like provided with an opening extending therethrough of a lens combination within said opening comprising a negative element of large diameter and a positive element of small diameter, the two elements so arranged with relation to each other as to form an image producing system.

7. The combination with a door, wall or the like provided with an opening extending therethrough of a lens combination within said opening comprising a negative element of large diameter and small focal length and a positive element of small diameter and substantially double the focal length of the negative element.

In testimony whereof I have signed this specification in the presence of two subscribing witnesses.

CARL HERTEL.

Witnesses:
E. H. HERMER,
G. KURSCHEWITZ.